United States Patent Office 3,039,741
Patented June 19, 1962

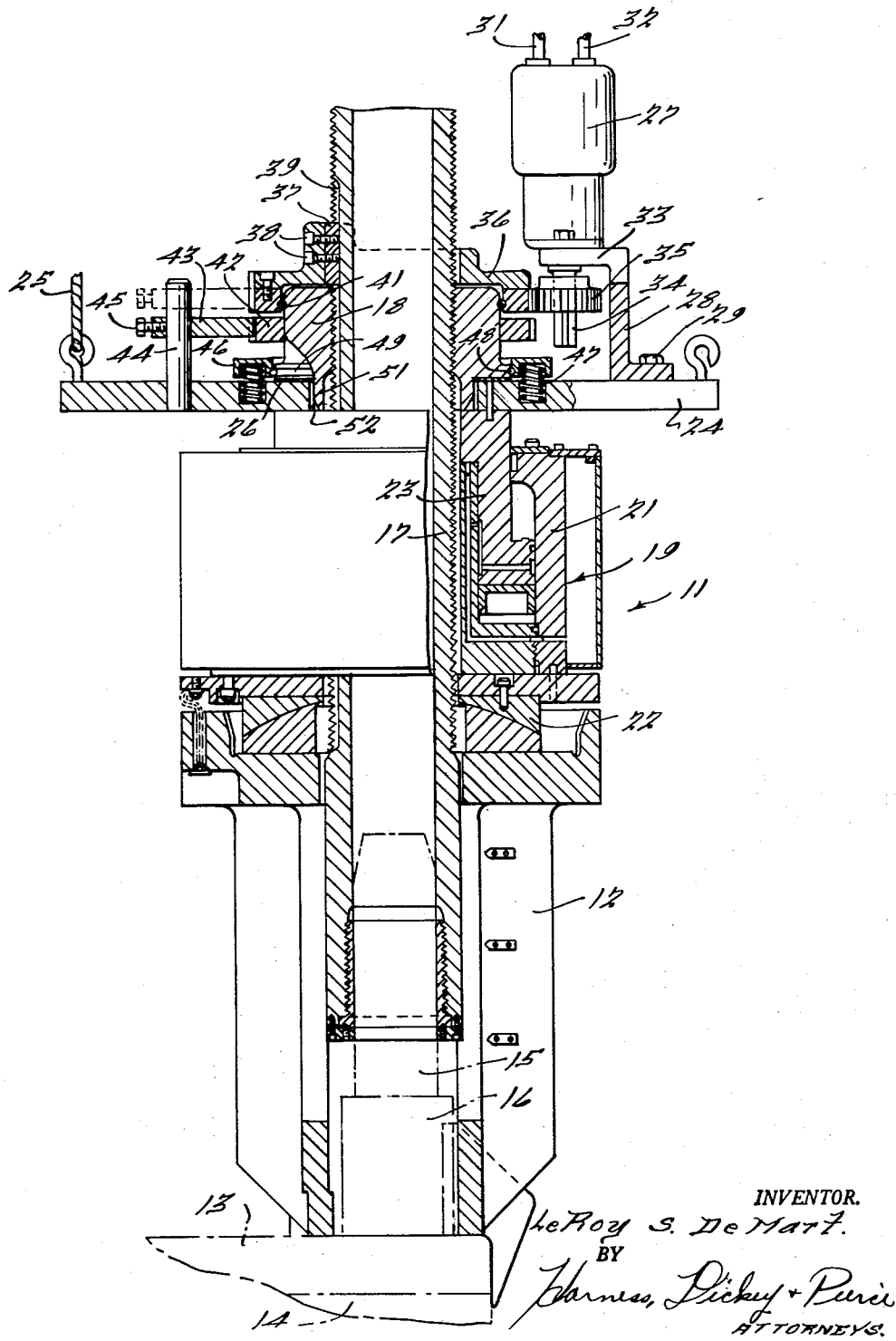

3,039,741
STUD TENSIONER
Le Roy S. De Mart, Lancaster, Ohio, assignor to Diamond Power Specialty Corporation, Lancaster, Ohio, a corporation of Ohio
Filed May 31, 1960, Ser. No. 32,902
6 Claims. (Cl. 254—30)

This invention relates to stud tensioners, and more particularly to means for quickly actuating the drawbar of such devices under varying operational requirements.

It is an object of the invention to provide a novel and improved motor driving means for a stud tensioning device which may be used to actuate the drawbar in a quick and efficient manner, either by rotating the drawbar with respect to its thrust nut, or by rotating the thrust nut.

It is another object to provide an improved stud tensioner drive of this nature, which is of relatively inexpensive construction, is compact and easy to maintain and is reliable in performance.

Other objects, features and advantages of the present invention will become apparent from the subsequent description, taken in conjunction with the accompanying drawing.

In the drawing:

The FIGURE is a side elevational view of a stud tensioner incorporating the principles of the invention, parts being broken away.

In general terms, the invention comprises a stud tensioning device of the type having a tubular drawbar and means for urging the drawbar in a direction away from a stud to which it is connected. In the illustrated embodiment, a pedestal is provided which supports piston and cylinder elements, the piston acting against a thrust nut threadably mounted on the drawbar. A hanger plate is disposed between the thrust nut and piston, and an air operated rotary motor is supported on the hanger plate. Both the thrust nut and drawbar are provided with annular gears, and the output pinion of the motor is shiftable so as to be in meshing connection with either one or the other of these gears. A gear lock is also provided on the hanger plate and is engageable with that gear which is not being driven by the air motor. The thrust nut is supported by spring suspended radial bearings mounted on the hanger plate. In this manner, the drawbar may be quickly actuated by rotating it within the thrust nut, or may be moved vertically by rotating the thrust nut by means of the air motor.

Referring more particularly to the drawings, the stud tensioner is generally indicated at 11 and comprises a pedestal 12 adapted to engage a cover 13 for a pressure vessel 14, or other structural member having a plurality of circumferentially spaced studs 15. The stud tensioning device is adapted to elongate these studs in succession so that the nut 16 for each stud may be hand tightened, producing the required force on cover 13 when the stud is released.

A drawbar 17 of generally tubular shape is provided in stud tensioner 11, the lower end of this drawbar being adapted to engage stud 15 for tensioning purposes. In the illustrated embodiment of the invention, means for threadably connecting the drawbar to the stud is shown; however, the drawbar could also be adapted for a quick type of connection to the stud, by means of which the drawbar could be lowered down into engaging position by rotation of a thrust nut 18.

The major portion of drawbar 17 is externally threaded, and thrust nut 18 is threadably mounted at the upper portion thereof. A reciprocable motor generally indicated at 19 is disposed between the thrust nut and pedestal and is adapted to exert upward force on the thrust nut so as to urge drawbar 17 away from the stud. This motor comprises a cylinder 21, the lower end of which is connected to the upper end of pedestal 12 by a spherical bearing 22, and a piston 23 extending from the upper end of the cylinder. Cylinder 21 and piston 23 are of annular shape, with drawbar 17 extending therethrough. The upper end of piston 23 is engageable with a hanger plate 24 which is supportable by cables 25 attached to a carriage (not shown) or other means for lifting the stud tensioner. It should be kept in mind that when used with studs for large pressure vessels, the weight of stud tensioner 11 may be quite heavy. A thrust washer 26 is disposed between thrust nut 18 and hanger plate 24.

Means are provided for driving drawbar 17 or thrust nut 18 in rotation, this means comprising an air operated motor 27 mounted on a Z-shaped bracket 28 the lower end of which is secured to hanger plate 24 by bolts 29. Air motor 27 may be of a reversible type supplied by air lines 31 and 32, and is vertically arranged, the lower end of the motor being secured to the upper portion 33 of bracket 28. A drive shaft 34 (which may be driven through reduction gearing) extends downwardly from upper bracket portion 33 in parallel relation with drawbar 17. A driving pinion 35 is keyed to and slidably mounted on shaft 34. Drawbar 17 is provided with a gear 36 slidably and non-rotatably secured thereto by a key 37 secured by bolts 38, key 37 sliding in a keyway 39 formed in drawbar 17. Gear 36 is of generally inverted bell shape and has external teeth meshable with pinion 35 when the latter is in its upper position. Gear 36 encloses the upper portion of thrust nut 18, with a plurality of anti-friction bearings 41 being disposed between gear 36 and the thrust nut.

A thrust nut gear 42 of annular shape is secured to an intermediate portion of the external surface of thrust nut 18, immediately below the teeth of gear 36. Gear 42 is fixed to thrust nut 18 and has the same pitch diameter, tooth shape and number of teeth as gear 36. Pinion 35 is meshable with the teeth of gear 42 when the pinion is shifted to its lower position.

A gear lock 43 is mounted on a post 44 the lower end of which is secured to hanger plate 24. Lock 43 is slidably mounted on post 44 and is engageable with either gear 36 or 42 to lock such gear against rotation. A clamping screw 45 is provided for holding lock 43 in either of its positions. An annular plate 46 is provided, this member being supported a slight distance above hanger plate 24 by circumferentially spaced helical compression springs 47 received by recesses in the plate. Thrust nut 18, and thus drawbar 17 and their connected parts, are yieldably suspended by member 46 through spherical members 48 which are seated in an internal groove formed in member 46 and an annular groove 49 formed in thrust nut 18. The thrust nut has a lower extension 51 disposed within a recess 52 in hanger plate 24. The spring suspension of the thrust nut, drawbar and associated parts increases the maneuverability of the drawbar when engaging or disengaging a stud, as described more fully in my copending application Serial No. 848,848, filed October 26, 1959. It will be noted that the spring suspension will in no way interfere with operability of the novel driving means of this invention.

In operation, it will be apparent that air motor 27 may be used either to rotate the drawbar while the thrust nut is held stationary or to raise and lower the drawbar by rotating the thrust nut with respect to the drawbar and hanger plate 24. To rotate the drawbar with respect to the thrust nut, for example when threading the drawbar onto a stud 15, it is merely necessary to engage gear lock 43 with gear 42 and engage pinion 35 with gear 36. As the drawbar moves vertically with respect to the thrust nut, it will pass through gear 36 by means of keyway 39 which receives key 37. Should it be desired to raise or lower the drawbar without rotating it, for example when approaching a stud or when using a quick type of stud connection, gear lock 43 will be engaged with gear 36 and pinion 35 with gear 42. Rotation of the thrust nut by air motor 27 will thus raise or lower drawbar 17 without rotation of the drawbar.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a stud tensioning device, a drawbar adapted to be connected to a stud, a thrust pin threadably mounted on said drawbar, a pedestal, means for simultaneously moving said drawbar and thrust nut with respect to said pedestal in the direction of the drawbar axis, a rotatable motor mounted adjacent said thrust nut and drawbar, shiftable driving means connecting said motor to said drawbar and thrust nut whereby said motor may selectively drive either said drawbar or said thrust nut, and means for selectively locking said drawbar or thrust nut against rotation.

2. In a stud tensioning device, a tubular drawbar having one end adapted to be connected to a stud, a thrust nut threadably mounted on said drawbar, a relatively stationary member engageable by one end of said thrust nut, said drawbar passing through said stationary member, a pedestal, means for simultaneously moving said drawbar, thrust nut and stationary member with respect to said pedestal in the direction of the drawbar axis, a rotatable motor mounted on said stationary member, and selectively shiftable driving means between said motor and said drawbar and thrust nut.

3. In a stud tensioning device, a drawbar of tubular shape, one end of said drawbar being adapted for connection to a stud, a thrust nut threadably mounted on said drawbar, a stationary member engageable by said thrust nut, a reversible motor, a first gear slidably and non-rotatably connected to said drawbar, a second gear secured to said thrust nut, and selectively shitfable driving means connected to said motor and engageable with either of said gears.

4. In a stud tensioning device, an externally threaded drawbar, one end of said drawbar being adapted for connection to a stud, a thrust nut rotatably mounted on said drawbar, an apertured member for receiving said drawbar and supporting one end of said thrust nut, a reversible rotatable motor mounted on said member, a driving pinion connected to said motor and having an axis parallel to the drawbar axis, a first gear slidably and non-rotatably connected to said drawbar, a second gear of the same size as said first gear and secured to said thrust nut, said pinion being selectively shiftable into meshing engagement with either of said gears, and means for selectively locking said drawbar or thrust nut against rotation relative to said member.

5. In a stud tensioning device, a tubular drawbar having external threads with one end thereof adapted to be secured to a stud, a thrust nut threadably mounted on said drawbar, a stationary plate engageable by said thrust nut, means carried by said plate for radially supporting said thrust nut, a first gear slidably and non-rotatably connected to said drawbar, a second gear of the same size as said first gear secured to said thrust nut, reversible motor means selectively connectable to either of said gears, and a lock selectively connectable with either said thrust nut or said drawbar.

6. In a stud tensioning device, a tubular drawbar having one end adapted to be connected to a stud, a thrust nut threadably mounted on said drawbar, a stationary member rotatably supporting said thrust nut, a first gear slidably connected to said drawbar and having a portion radially supported by one end of said thrust nut, a second gear of the same size as said first gear and secured to said thrust nut adjacent said first gear, a reversible motor mounted on said member, a driving pinion for said motor selectively engageable with either of said gears, and a gear lock mounted on said member and selectively engageable with either of said gears.

References Cited in the file of this patent
UNITED STATES PATENTS
1,982,835    Stampfli et al. _____ Dec. 4, 1934

UNITED STATES PATENT OFFICE
CERTIFICATE OF CORRECTION

Patent No. 3,039,741            June 19, 1962

Le Roy S. De Mart

It is hereby certified that error appears in the above numbered patent requiring correction and that the said Letters Patent should read as corrected below.

Column 1, line 65, after "lowered" insert -- straight --; column 2, line 29, for "pinon" read -- pinion --; column 3, line 15, for "pin" read -- nut --.

Signed and sealed this 16th day of October 1962.

(SEAL)
Attest:

ERNEST W. SWIDER
Attesting Officer

DAVID L. LADD
Commissioner of Patents